(12) United States Patent
Hodgson et al.

(10) Patent No.: US 9,388,723 B2
(45) Date of Patent: Jul. 12, 2016

(54) REDUCING AGENT DELIVERY DEVICE WITH COMPENSATION ELEMENT, METHOD FOR COMPENSATING FREEZING OF A REDUCING AGENT IN A DELIVERY DEVICE AND MOTOR VEHICLE HAVING A DELIVERY DEVICE

(75) Inventors: Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 83 days.

(21) Appl. No.: 13/410,876

(22) Filed: Mar. 2, 2012

(65) Prior Publication Data

US 2012/0174565 A1 Jul. 12, 2012

Related U.S. Application Data

(63) Continuation of application No. PCT/EP2010/062076, filed on Aug. 19, 2010.

(30) Foreign Application Priority Data

Sep. 2, 2009 (DE) .......................... 10 2009 039 735

(51) Int. Cl.
 *B67D 7/16* (2010.01)
 *F01N 3/24* (2006.01)
 (Continued)

(52) U.S. Cl.
 CPC ............ *F01N 3/2066* (2013.01); *F01N 2610/14* (2013.01); *F01N 2610/1446* (2013.01); *Y02T 10/24* (2013.01); *Y10T 137/0318* (2015.04)

(58) Field of Classification Search
 CPC .................... F01N 2610/1446; F01N 2610/14; F01N 3/2006; Y02T 10/24
 USPC ............ 60/274, 286, 287; 138/26, 27, 28, 29, 138/30, 31
 See application file for complete search history.

(56) References Cited

U.S. PATENT DOCUMENTS 6,209,315 B1 * 4/2001 Weigl ............................ 60/274
6,682,325 B1 * 1/2004 Beck ............................ 417/440
(Continued)

FOREIGN PATENT DOCUMENTS

DE          10361867 A1    7/2005
DE       202007009337 U1   11/2008
(Continued)

OTHER PUBLICATIONS

The machine translation of WO 2009/003858 A1.*
(Continued)

*Primary Examiner* — Kenneth Bomberg
*Assistant Examiner* — Brandon Lee
(74) *Attorney, Agent, or Firm* — Laurence A. Greenberg; Werner H. Stemer; Ralph E. Locher

(57) ABSTRACT

A delivery device for delivering liquid reducing agent includes a reducing agent tank. At least a delivery unit, at least one first compensation element, a reducing agent line and a metering unit together have an overall volume to be filled with a reducing agent and are configured for delivering, conducting and metering the reducing agent from the reducing agent tank. The at least one first compensation element is configured for reducing the overall volume when a negative pressure occurs in the delivery device. A method for compensating freezing of a reducing agent in a delivery device and a motor vehicle having a delivery device, are also provided.

16 Claims, 3 Drawing Sheets

(51) Int. Cl.
*F17D 3/00* (2006.01)
*F01N 3/20* (2006.01)

(56) References Cited

U.S. PATENT DOCUMENTS

| | | | |
|---|---|---|---|
| 7,481,049 B2 | 1/2009 | Huber et al. | |
| 2010/0064670 A1* | 3/2010 | Starck et al. | 60/295 |
| 2011/0113765 A1 | 5/2011 | Brück et al. | |
| 2011/0194987 A1 | 8/2011 | Hodgson et al. | |

FOREIGN PATENT DOCUMENTS

| | | |
|---|---|---|
| DE | 102008022991 A1 | 11/2009 |
| DE | 102008044078 A1 | 5/2010 |
| EP | 1 553 270 A1 | 7/2005 |
| EP | 1 602 805 A1 | 12/2005 |
| JP | S61142993 U | 9/1986 |
| JP | H0271016 U | 5/1990 |
| WO | 0225075 A1 | 3/2002 |
| WO | WO 2006136306 A1 * | 12/2006 |
| WO | 2009003858 A1 | 1/2009 |
| WO | 2010023124 A1 | 3/2010 |

OTHER PUBLICATIONS

International Search Report of PCT/EP2010/062076, Dated Oct. 6, 2010.

* cited by examiner

REDUCING AGENT DELIVERY DEVICE WITH COMPENSATION ELEMENT, METHOD FOR COMPENSATING FREEZING OF A REDUCING AGENT IN A DELIVERY DEVICE AND MOTOR VEHICLE HAVING A DELIVERY DEVICE

CROSS-REFERENCE TO RELATED APPLICATION

This is a continuation, under 35 U.S.C. §120, of copending International Application No. PCT/EP2010/062076, filed Aug. 19, 2010, which designated the United States; this application also claims the priority, under 35 U.S.C. §119, of German Patent Application DE 10 2009 039 735.3, filed Sep. 2, 2009; the prior applications are herewith incorporated by reference in their entirety.

BACKGROUND OF THE INVENTION

Field of the Invention

The present invention relates to a delivery device for delivering liquid reducing agent from a reducing agent tank into an exhaust-gas purification system, wherein the delivery device includes a special compensation element. The invention also relates to a method for compensating freezing of a reducing agent in a delivery device and a motor vehicle having a delivery device.

In view of the present emissions limit values for exhaust gases of internal combustion engines, which will be further tightened in the near future, increasing use is being made of SCR systems for exhaust-gas purification in utility vehicles and motor vehicles. In that case, a reducing agent is used in a variety of forms, in particular in the form of reducing agent precursors which are present in aqueous solution (Denoxium, AdBlue). AdBlue is a trademark used for an available urea-water solution with a urea fraction of approximately 32.5 percent by weight. In the use of SCR technology, it must be noted that freezing of the reducing agent is possible at low ambient temperatures or through cooling effects as a result of convection. An aqueous urea-water solution typically freezes at temperatures below −11° C. Components of the SCR system, for example filters, reducing agent lines or valves of the delivery device, can be damaged as a result of the increase in volume due to the phase change of the reducing agent from liquid to solid.

It has been proposed, as a solution to that known problem, that flexible reducing agent lines or reducing agent lines with volume compensation elements be provided, which increase the volume of reducing agent lines as a result of the ice pressure of the frozen reducing agent or reducing agent precursor, for compensating the expansion. It has, however, not yet been possible for them to be developed into an inexpensive and reliable form of protection which is appropriate from a component aspect.

SUMMARY OF THE INVENTION

It is accordingly an object of the invention to provide a reducing agent delivery device with a compensation element, a targeted method for compensating freezing of a reducing agent in such a delivery device and a motor vehicle having a delivery device, which overcome the hereinafore-mentioned disadvantages of the heretofore-known devices, methods and vehicles of this general type and in which the compensation element further reduces risks posed to the delivery device by a freezing process.

With the foregoing and other objects in view there is provided, in accordance with the invention, a delivery device for delivering liquid reducing agent. The delivery device comprises a reducing agent tank. At least a delivery unit, at least one first compensation element, a reducing agent line and a metering unit together have an overall volume to be filled with a reducing agent and are configured for delivering, conducting and metering the reducing agent from the reducing agent tank. The at least one first compensation element is configured for reducing the overall volume when a negative pressure occurs in the delivery device.

Within the context of the present invention, a negative pressure means a negative pressure in relation to the ambient pressure. Likewise, a positive pressure means a positive pressure in relation to the ambient pressure.

The present invention is based on the realization that, before the freezing of a reducing agent in a delivery device, cooling of the reducing agent always takes place, and during that cooling, a reduction in volume of the reducing agent takes place. Measurements with an aqueous urea solution have shown that a significant reduction in volume already takes place during the cooling of the reducing agent from 20° C. to 0° C. In delivery devices known from the prior art, a vacuum is formed in the delivery device due to the reduction in volume. The vacuum causes additional reducing agent to be delivered from the reducing agent tank into the delivery device through the valves of the delivery unit. As a result, the filling level of the delivery device increases during cooling. When reducing agent which has cooled to that extent cools further, it begins to freeze at temperatures of approximately −11° C. In that case, an increase in volume then takes place which is greater than the reduction in volume that takes place previously during cooling. The increase in volume leads to an increased pressure in the delivery device. The increase in pressure is greater the more that additional reducing agent is additionally sucked into the delivery device through the delivery unit during the reduction in volume during cooling. Through the use of the compensation element according to the invention, the amount of additional reducing agent in the delivery device can be reduced or even completely eliminated, in such a way that in a delivery device according to the invention, lesser measures need be taken to ensure that the delivery device withstands the ice pressure.

It is particularly advantageous in this case if the delivery device does not decrease in volume for as long as no negative pressure prevails in the delivery device, and the first compensation element very quickly and very freely permits a reduction in volume when a negative pressure prevails. In this way, it can be ensured that the delivery device exhibits substantially incompressible behavior in the operating range, that is to say at pressures above 0 bar. In this way, it is possible to attain a high degree of uniformity of the reducing agent pressure provided by the delivery device. At the same time, no unnecessary energy is expended for an elastic expansion of the delivery device as a result of a pressure increase during operation.

In accordance with another particularly advantageous feature of the delivery device of the invention, the at least one first compensation element is constructed in the form of a diaphragm, for which there is provided a contact surface constructed in such a way that, when a positive pressure prevails in the delivery device, the diaphragm bears substantially immovably against the contact surface and, when a negative pressure prevails in the delivery device, the diaphragm can move into the overall volume.

The contact surface may, for example, be a portion of an inner wall of a line of the delivery device.

In the contact surface downstream of the diaphragm there may be provided, for example, a bore through which air or the like can pass freely between the diaphragm and the contact surface when a negative pressure prevails in the delivery device. The air which is separated from the overall volume of the delivery device by the diaphragm thus fills a part of the overall volume in the delivery device. The diaphragm can preferably be very easily deformed when a negative pressure prevails, because the large surface area of the relatively thin diaphragm can bend easily. When a positive pressure prevails, the diaphragm is pressed against the contact surface. A movement of the diaphragm is then possible, for example, only in the region of the described bore in the contact surface. The bore is, however, very small in relation to the contact surface against which the diaphragm bears. As viewed over the very small area of the bore, the diaphragm is relatively rigid, even though it has the same thickness there as it does in the other regions. For this reason, the diaphragm cannot expand to a significant extent into the bore, so that there is no significant increase in the overall volume when positive pressures prevail in the system.

As an alternative to a bore, a grate may also be provided downstream of the diaphragm. It is then again possible for the diaphragm to freely expand into the overall volume, whereas when a positive pressure prevails in the system, the diaphragm bears against the grate and an expansion of the diaphragm into the individual openings of the grate does not take place to a significant extent.

It would also be possible for the diaphragm to be formed, in parts, with different thicknesses. That region of the diaphragm which comes to rest over the bore or the grate could be constructed to be thicker in order to ensure that the abutting diaphragm does not deform. Adjacent regions could be constructed to be thin and flexible, optionally even with a corrugation, in order to ensure that free mobility of the diaphragm is ensured in this case when the latter moves into the overall volume of the delivery device when a negative pressure prevails. The movable regions of the diaphragm could possibly also be formed with a corrugation or the like in order to ensure even further increased flexibility in this case.

It is also possible for a diaphragm to be provided which is composed of different materials. Either a relatively rigid material with a relatively high modulus of elasticity and/or with a relatively large thickness can be used in individual regions of the diaphragm, and/or the diaphragm may be stiffened in regions through the use of an additional layer and/or a stiffening structure.

In accordance with a further particularly advantageous feature of the delivery device of the invention, the at least one first compensation element permits a reduction in size of the overall volume by up to at most 5%.

It has been found in experiments that reductions in volume by up to 5% can occur during the freezing of aqueous reducing agent proceeding from conventional operating temperatures, which may typically be 20° C. or even up to 80° C. It is, however, preferable for the first compensation element to permit reductions in volume by at least 2% of the overall volume.

In accordance with an added particularly advantageous feature of the delivery device of the invention, the at least one first compensation element permits a reduction in size of the overall volume by up to 5% at a negative pressure of lower than 500 mbar [millibars]. In this case, it is particularly preferable for a reduction in volume by up to 2% to be possible at a negative pressure of lower than 500 mbar [millibars], preferably lower than 200 mbar [millibars] and particularly preferably lower than 100 mbar [millibars].

This embodiment of the delivery device according to the invention is based on the concept that the negative pressure in the delivery device should not become very large, so that no additional reducing agent is sucked or suctioned out of the reducing agent tank into the delivery device. When low negative pressures prevail in the system, there is a lower probability of this occurring, and/or no measures or lesser measures need be taken to prevent reducing agent from being sucked in from the reducing agent tank. Also, a flow resistance may be provided in a suction line for sucking reducing agent out of a reducing agent tank. The flow resistance ensures that reducing agent does not flow from the reducing agent tank into the delivery device when cooling of the delivery device is taking place. Such a flow resistance is intended merely to ensure that the negative pressure required for volume reduction through the use of the first compensation element is lower than the negative pressure at which additional reducing agent is sucked in from the reducing agent tank.

In accordance with an additional particularly advantageous feature of the delivery device of the invention, at least one second compensation element is provided which is suitable for increasing the size of the overall volume when a threshold positive pressure is reached in the delivery device, so that when a pressure below the threshold positive pressure prevails, the at least one second compensation element permits substantially no increase in size of the overall volume.

Such a second compensation element (expansion element) thus increases the size of the volume of the delivery device when a certain threshold positive pressure is exceeded. It is preferable for no significant increase in size of the overall volume to take place before then. The reason for this is that, in the range of the delivery pressures at which the delivery device according to the invention is operated, the delivery device should exhibit the most rigid behavior possible in order to permit particularly energy-efficient and reliable delivery of reducing agent. When the reducing agent in the delivery device has cooled completely and an expansion of the reducing agent occurs due to the freezing process, pressures arise which are significantly higher than the normal delivery pressures. The second compensation element now permits a controlled increase in size of the overall volume at such pressures, in such a way that the ice pressure in the delivery device does not cause damage.

In accordance with yet another particularly advantageous feature of the delivery device of the invention, the threshold positive pressure is at least 5 bar. The threshold positive pressure is specified herein in each case as a pressure above the ambient pressure, that is to say relative to the ambient pressure. Delivery pressures of the delivery devices are normally less than 5 bar. It is, however, also possible to use higher delivery pressures, for example up to at most 10 bar or even up to at most 15 bar. It would, for example, be expedient for the threshold pressure to be set so as to be at least 1 bar higher than the maximum delivery pressure of the delivery device.

In accordance with yet a further particularly advantageous feature of the delivery device of the invention, the at least one second compensation element can increase the size of the overall volume by up to 15%. It is preferable if the second compensation element can increase the size of the overall volume by at most between 2 and 15%, in particular at most between 3 and 10%. It has been found in experiments that such increases in the size of the volume can regularly occur during the freezing of reducing agent. It is preferable to provide precisely only one second compensation element which permits this.

In accordance with yet an added particularly advantageous feature of the delivery device of the invention, the at least one second compensation element increases the size of the overall volume substantially abruptly when the threshold positive pressure is reached. As a result of such an abrupt (sudden, immediate) increase in size, the ice pressures arising in the delivery device during the freezing process do not become greater than the threshold positive pressure. It is also possible for the second compensation element to be constructed in such a way that, when the positive pressure is reached, an abrupt reduction in pressure in the delivery device takes place at the same time as the abrupt increase in size of the overall volume. With a second compensation element of this type, when the threshold positive pressure is reached, a stable equilibrium position is assumed, in such a way that the overall volume is not reduced in size again despite the sudden pressure drop.

In addition or alternatively, above the threshold positive pressure, a continuous increase in size of the overall volume can take place with a further increase in pressure. With such a construction, however, the pressure in the delivery device would rise even further above the threshold positive pressure.

In accordance with yet an additional particularly advantageous feature of the delivery device of the invention, the at least one second compensation element is constructed in the form of a surface part under preload, wherein when a positive pressure above a threshold positive pressure prevails, the surface part can move counter to the preload, in such a way that the overall volume increases in size. A surface part under preload typically behaves in the manner of a clicker, which clicks into position. If that surface part is loaded counter to the preload by a certain force, or by a certain pressure acting on the surface part, the surface part abruptly snaps over, resulting in a sudden increase in the size of the volume. It is generally expedient if, during a sudden snap-over, the surface part moves against a stop and bears against the latter without reaching a further stable position. The surface part would only be able to pass back into the original preloaded position from a further stable position under the action of a corresponding counter-pressure or a corresponding counteracting force. Through the use of a stop, the surface part can be prevented from reaching a further stable position, in such a way that the surface part snaps back into the preloaded position when the pressure falls below the threshold positive pressure.

In accordance with again another particularly advantageous feature of the delivery device of the invention, the at least one first compensation element and the at least one second compensation element are formed jointly as a combined compensation element. It is, for example, possible for a large surface part which is under preload to be provided as a second compensation element, and for a first compensation element in the form of a diaphragm to be provided directly on that surface part. The surface part under preload then has, for example, a corresponding bore in order to ensure that air can pass between the diaphragm and the surface part. It is also possible for the first compensation element and the second compensation element as a combined compensation element to be formed singly or in one piece and in a compact integrated component.

In accordance with again a further particularly advantageous feature of the delivery device of the invention, the at least one first compensation element is disposed between the delivery unit and the metering unit. The high-pressure region of a delivery device is generally situated between the delivery unit and the metering unit because the pressure is generated in the delivery device by the delivery unit and is dissipated by the metering unit, which supplies the reducing agent into the exhaust system of an internal combustion engine. The metering unit is, for example, an injector. The delivery unit is, for example, a pump. Pressurized reducing agent which cannot expand into a large volume, for example the tank, is generally situated in the high-pressure region. It is particularly preferable for the first compensation element to be disposed close (in particular directly adjacent) to the delivery unit. The freezing process can then take place proceeding from the metering unit in the direction of the first compensation element, in such a way that an ice plug, which would separate a still-liquid volume of reducing agent from the first compensation element and thereby prevent the first compensation element from imparting its compensating effect, is not formed in the delivery device. In this case, it is also considered to be particularly advantageous if the second compensation element, if provided, is likewise provided so as to be disposed between the delivery unit and the metering unit, if possible close to the delivery unit.

With the objects of the invention in view, there is also provided a method for compensating freezing of liquid reducing agent in a delivery device having an overall volume filled with liquid reducing agent. The method comprises:
   a) decreasing the overall volume of the delivery device with a first compensation element upon cooling of the reducing agent in the delivery device; and
   b) increasing the overall volume of the delivery device with a second compensation element upon freezing of the reducing agent in the delivery device.

In particular, the overall volume of the delivery device is reduced in size in step a) in such a way that there is no follow-up flow of reducing agent into the delivery device. Furthermore, the increase in volume during the freezing of the reducing agent in step a) is generally greater than the reduction in volume during the cooling in step b).

Such a method may particularly preferably be carried out by using a delivery device according to the invention. A particular advantage of the method according to the invention is that the changes in volume of the delivery device always take place in a defined manner at corresponding compensation elements, in such a way that no inadmissible expansions and stresses can arise in the delivery device.

With the objects of the invention in view, there is concomitantly provided a motor vehicle, comprising an internal combustion engine, an exhaust system associated with the internal combustion engine and configured for carrying out a selective catalytic reduction, and a delivery device according to the invention having a reducing agent tank and being configured for delivering reducing agent from the reducing agent tank into the exhaust system.

The technical refinements and advantages specified for the delivery device according to the invention are analogously applicable and transferable to the method according to the invention and to the motor vehicle according to the invention. The same applies to the advantages and special technical refinements specified in conjunction with the motor vehicle according to the invention and the method according to the invention, which advantages and refinements can be applied and transferred to the device according to the invention.

Other features which are considered as characteristic for the invention are set forth in the appended claims, noting that the features specified individually in the claims may be combined with one another in any desired technologically meaningful way and may be supplemented by explanatory facts from the description, with further structural and process variants of the invention being specified.

Although the invention is illustrated and described herein as embodied in a reducing agent delivery device with a compensation element, a method for compensating freezing of a reducing agent in a delivery device and a motor vehicle having a delivery device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
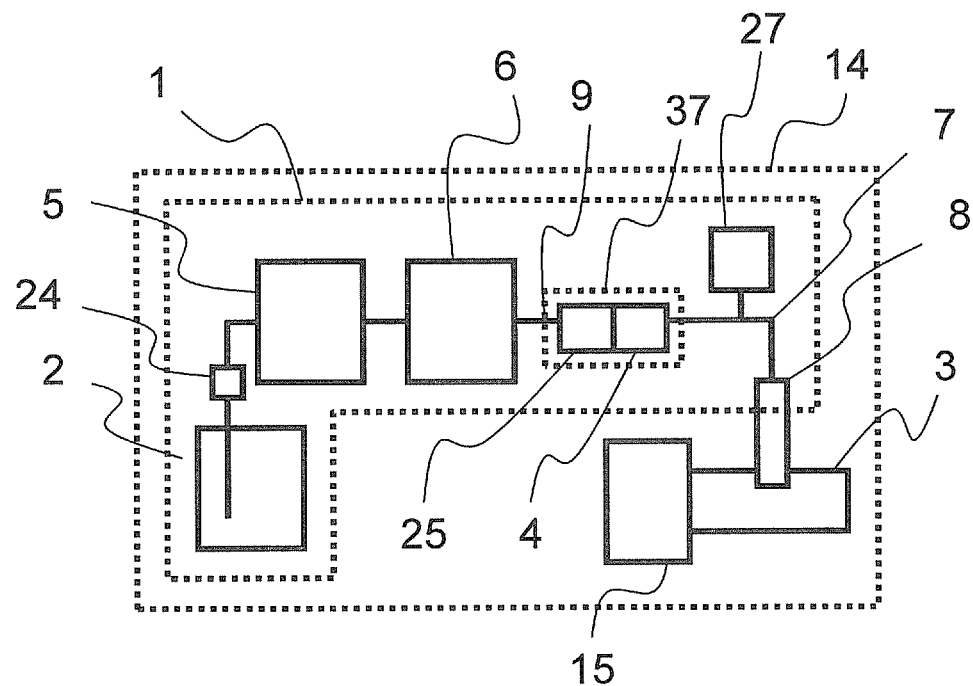
FIG. 1 is a diagrammatic, plan view of a motor vehicle having a first structural variant of a delivery device according to the invention.

Referring now to the figures of the drawings in detail and first, particularly, to FIG. 1 thereof, there is seen a motor vehicle 14 having an internal combustion engine 15 with an exhaust system 3. The exhaust system 3 has a metering unit 8 for metering a reducing agent (aqueous urea solution) into the exhaust system 3. The reducing agent is supplied to the metering unit 3 from a reducing agent tank 2 through the use of a delivery device 1. The reducing agent passes from the reducing agent tank 2 through a reducing agent line 7 to the metering unit 8. A flow resistance 24, a filter 5, a delivery unit 6, a first compensation element 4 and a pressure sensor 27 are provided along the reducing agent line 7 from the reducing agent tank 2 to the metering unit 8. The sequence of components may deviate in part from the sequence described herein. It is optionally additionally possible for a second compensation element 25 or a combined compensation element 37 to be provided in the region of the first compensation element 4. All of the components of the delivery device 1, with the exception of the reducing agent tank 2, together have an overall or total volume 9. It is also possible for the overall volume 9 to relate only to those components of the delivery device 1 which are disposed between the metering unit 8 and the delivery unit 6. The first compensation element 4 is suitable for reducing the volume 9 of the delivery device 1 when a negative pressure prevails in the delivery device 1. The first compensation element 4 interacts with the flow resistance 24 in such a way that, when a negative pressure prevails, the overall volume 9 of the delivery device 1 can be reduced through the use of the first compensation element 4 more easily than additional reducing agent from the reducing agent tank 2 can be sucked into the delivery device 1 through the flow resistance 24.

Figure 2:
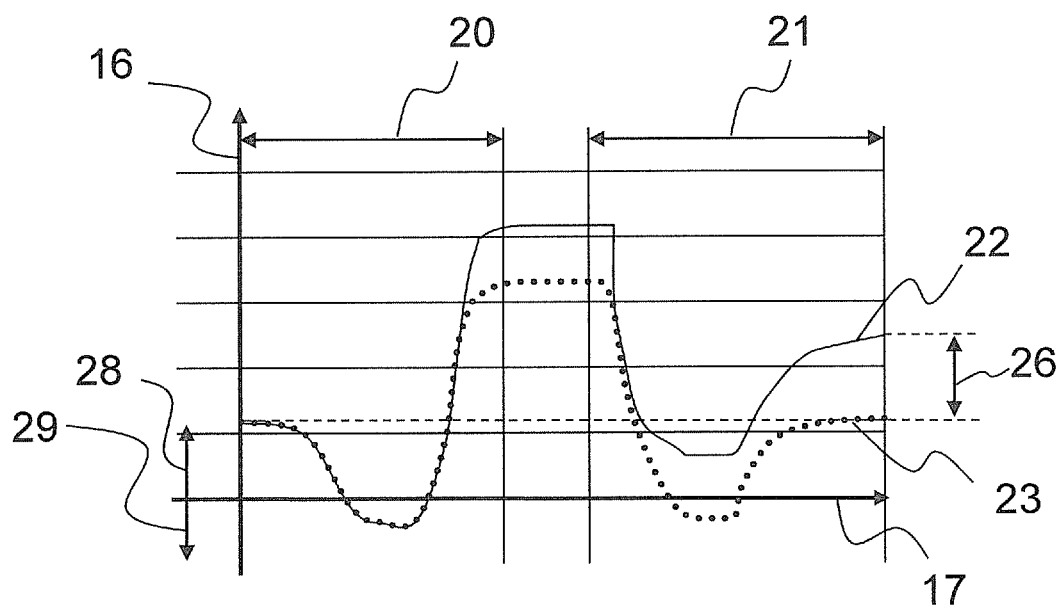
FIG. 2 is a diagram illustrating a freezing behavior of the delivery device.

FIG. 2 is a simplified diagram illustrating how a pressure in a reducing agent delivery device according to the invention behaves in relation to a pressure in a reducing agent delivery device known from the prior art, during freezing and thawing processes of the reducing agent contained therein. A reducing agent pressure present in the system is plotted on a pressure axis 16 in each case. That pressure is plotted against a time axis 17. An area above the time axis 17 represents a positive pressure 28 and an area below the time axis 17 represents a negative pressure 29. A first curve 22 depicts the pressure in a delivery device known from the prior art. A second curve 23 depicts the pressure in a delivery device according to the invention. A freezing time period 20 is illustrated first. During cooling of the reducing agent, the negative pressure 29 arises due to a reduction in volume of the reducing agent. In this case, in the delivery device known from the prior art according to the first curve 22, additional reducing agent is sucked into the delivery device from the reducing agent tank. In the delivery device of the invention according to the second curve 23, the decrease in volume is compensated by a first compensation element, in such a way that no additional reducing agent passes into the delivery device. During a freezing process, the pressure both in the delivery device known from the prior art and also in the delivery device according to the invention rises considerably. However, the pressure in the delivery device known from the prior art rises more intensely because, in that delivery device, additional reducing agent is present which has previously been sucked in by the negative pressure during the freezing process. In a thawing time period 21, the pressure initially falls intensely in both delivery devices. However, in the delivery device known from the prior art, a negative pressure 29 is not attained again, or is attained to a lesser degree than in the delivery device according to the invention, because in the delivery device known from the prior art additional volume has been sucked into the delivery device. That additional volume cannot now escape because the valves in the delivery unit permit only a passage of reducing agent out of the reducing agent tank into the delivery device, and not in the other direction. The reason for this is that the pump is generally a pump with passively acting valves, in which the delivery direction is predefined by the structure of the valves. Therefore, in the case of the freezing and subsequent re-thawing of the reducing agent in a delivery device known from the prior art, the pressure after the re-thawing exhibits a pressure increase 26 in relation to the pressure present before the freezing process, or in relation to the pressure in a delivery device according to the invention.

In interpreting FIG. 2, it must be noted that FIG. 2 is merely a simplified illustration of the differences between delivery devices known from the prior art and the delivery device according to the invention. In the diagram in FIG. 2, only the influence of the first compensation element on the reducing agent volume sucked into the device during cooling, and the influence of that volume on the pressure in the delivery device, have been taken into consideration. In reality, the first compensation element also has a direct influence on the pressure in the delivery device itself. For example, during cooling, the pressure cannot fall as far as in delivery devices known from the prior art, because such a pressure drop is already prevented by the first compensation element.

Figure 3:
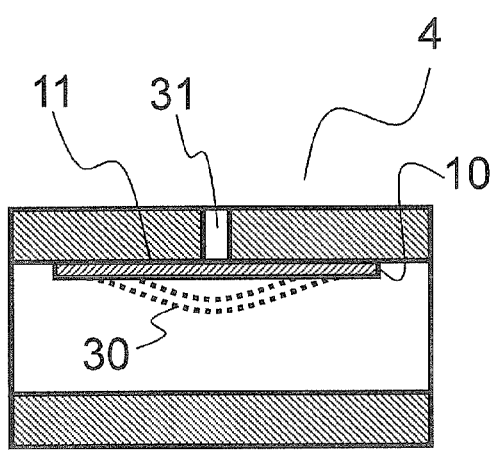
FIG. 3 is a cross-sectional view showing a structural variant of a first compensation element.

FIG. 3 shows a first compensation element 4 according to the invention, which is constructed with a diaphragm 10. When a positive pressure prevails, the diaphragm 10 bears against a contact surface 11. When a negative pressure prevails, the diaphragm 10 is deflected into a deflected position 30, in which air is then present between the diaphragm 10 and the contact surface 11, and the air is sucked through a bore 31 and can escape again at a later time.

Figure 4:
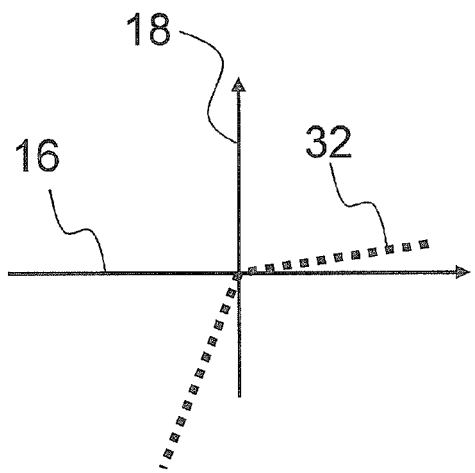
FIG. 4 is a pressure/volume characteristic curve of a structural variant of the first compensation element.

FIG. 4 shows a pressure/volume curve 32 of a first compensation element according to FIG. 3. The diagram shows a pressure axis 16 and a volume axis 18. When positive pressures prevail, the volume only increases slightly according to the pressure/volume curve 32. The reason for this is that the diaphragm bears against a contact surface and can only deform very slightly. When negative pressures prevail, there is an intense reduction in volume according to the pressure/volume curve 32. The reason for this is that the diaphragm can move very freely into a deflected position.

Figure 5:
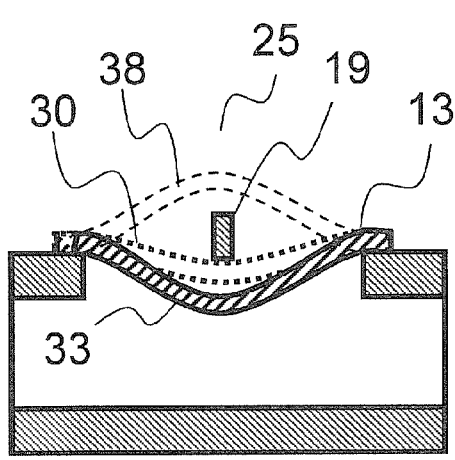
FIG. 5 is a cross-sectional view showing a structural variant of a second compensation element.

FIG. 5 shows a second compensation element 25. In the second compensation element 25, there is a surface part 13 which is under preload and which, in normal operation, is held in a preloaded position 33 due to its preload. If the pressure in the delivery device is now increased, the preloaded surface part 13 snaps over, above a certain pressure, into a deflected position 30. It is preferable if, even in the deflected position 30, the surface part cannot flip over completely but rather bears against a stop 19. It is thus ensured that the surface part 13 does not move into a stable equilibrium position 38 which differs from the preloaded position 33 and from which the surface part 13 could only move back with the exertion of a corresponding counteracting force.

Figure 6:
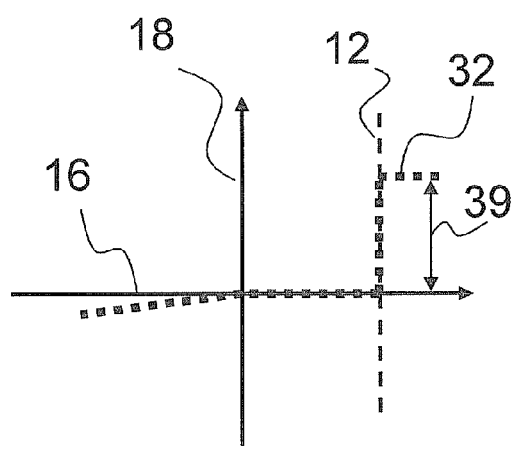
FIG. 6 is a pressure/volume characteristic curve of a structural variant of the second compensation element.

FIG. 6 shows a pressure/volume curve 32 of a second compensation element. The volume is plotted on a volume axis 18 against the pressure plotted on a pressure axis 16. When negative pressures prevail, the volume only decreases slightly in size, because the relatively rigid surface part only expands slightly under the acting forces. When positive pressures prevail, the surface part pauses in its preloaded position, in such a way that substantially no volume expansion takes place. When pressures higher than a threshold positive pressure 12 prevail, the diaphragm flips over suddenly into the deflected position, in such a way that an abrupt increase in volume 39 occurs. When pressures higher than the threshold positive pressure 12 prevail, no significant further increase in volume takes place because the surface part bears against the stop and can deform no further.

Figure 7:
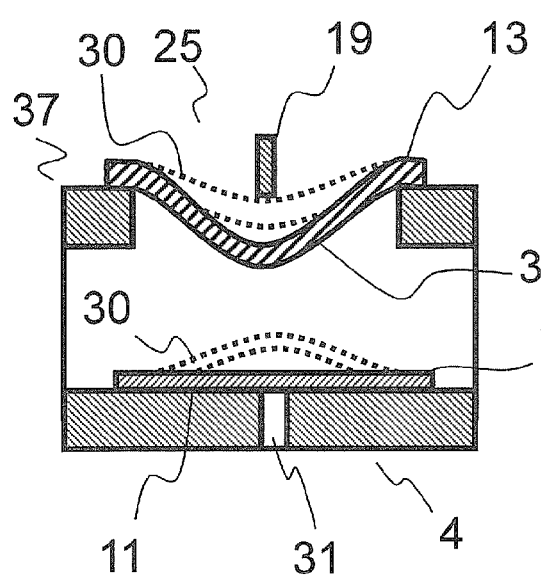
FIG. 7 is a cross-sectional view showing a structural variant of a combined compensation element.

FIG. 7 shows a combined compensation element 37 composed of a first compensation element 4 and a second compensation element 25. The first compensation element 4 has a diaphragm 10, a contact surface 11 and a bore 31, in which the diaphragm 10 can flip over into a deflected position 30. The second compensation element 25 in FIG. 7 is likewise composed of a surface part 13 and a stop 19, in which the surface part 13 is in a preloaded position 33 and can be flipped over into a deflected position 30.

Figure 8:
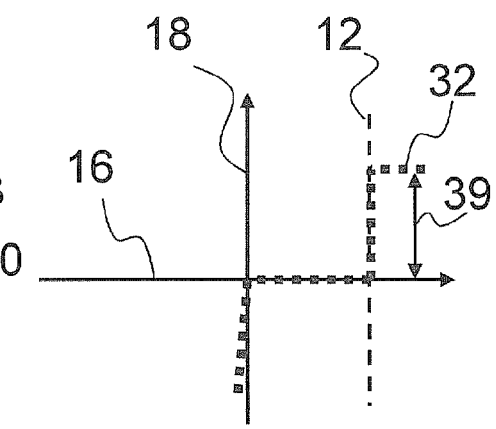
FIG. 8 is a pressure/volume characteristic curve of a structural variant of the combined compensation element.

FIG. 8 shows a pressure/volume curve 32 of a combined compensation element according to FIG. 7. The volume is plotted on a volume axis 18 against the pressure on a pressure axis 16. The pressure/volume curve 32 in FIG. 8 arises substantially from a superposition of the pressure/volume curves of FIGS. 4 and 6. The pressure/volume curve 32 exhibits an intense decrease in volume when negative pressures prevail, and a substantially constant volume when pressures prevail which lie between a neutral pressure and a threshold positive pressure. At the threshold positive pressure 12, an abrupt increase in volume 39 takes place. In that region, the operating range of the delivery device according to the invention is also such that the delivery device according to the invention with a combined compensation element exhibits substantially rigid behavior in the operating range. At a threshold positive pressure 12, a sudden increase in volume occurs. A pressure/volume curve according to FIG. 8 is always attained if a first compensation element and a second compensation element are provided in a delivery device according to the invention. For this reason, it is not necessary for the two to be formed as a combined compensation element.

Figure 9:
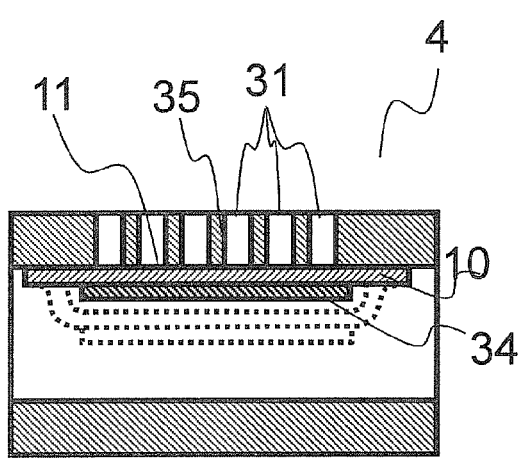
FIG. 9 is a cross-sectional view showing a further refinement of a first compensation element.

FIG. 9 shows an alternative structure of a first compensation element 4. In this case too, a diaphragm 10 bears against a contact surface 11 when a positive pressure prevails in the delivery device according to the invention. Instead of a bore 31, a grate 35 is provided in this case which may be formed, for example, from a multiplicity of bores 31. Furthermore, the diaphragm 10 is provided with a stiffening structure 34, in such a way that when a negative pressure prevails in the delivery device, the diaphragm 10 can move into a deflected position 30, but a deformation of the diaphragm 10 in the direction of the grate 35 is additionally impeded.

Figure 10:
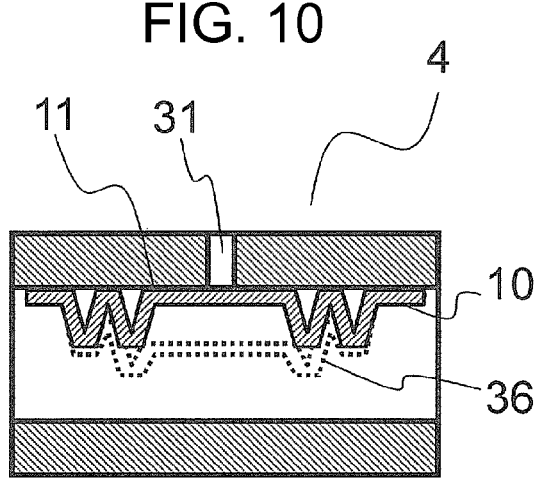
FIG. 10 is a cross-sectional view showing another refinement of the first compensation element.

In the embodiment of the first compensation element 4 according to FIG. 10, there is likewise a diaphragm 10 with a contact surface 11 and a bore 31 in the contact surface 11, in which the diaphragm 10 can move into a deflected position shown in dotted lines. In order to enhance the mobility of the diaphragm 10, a corrugation 36 is provided on the diaphragm 10 in this case, as a result of which, when a negative pressure prevails in the delivery device according to the invention, the diaphragm 10 can move more freely into the delivery device according to the invention, or into the overall volume, and into a deflected position 30.

The invention claimed is:

1. A delivery device for delivering liquid reducing agent, the delivery device comprising:
    a reducing agent tank; and
    a delivery unit for delivering liquid reducing agent, at least one first compensator for compensating changes in volume, a reducing agent line and a metering unit for metering liquid reducing agent;
    at least said delivery unit, said at least one first compensator, said reducing agent line and said metering unit together having an overall volume to be filled with a reducing agent and being configured for delivering, conducting and metering the reducing agent from said reducing agent tank;
    said at least one first compensator being configured for reducing said overall volume when a negative pressure occurs in the delivery device as a result of a reduction of volume in the reducing agent during cooling of the reducing agent prior to freezing of the reducing agent;
    said at least one first compensator being configured to permit no significant increase in said overall volume when a positive pressure prevails in the delivery device; and
    a contact surface, said at least one first compensator including a diaphragm disposed on said contact surface, said contact surface having a bore formed therein within an area of said diaphragm, said bore for allowing air to contact the diaphragm and deflect the diaphragm when a negative pressure prevails in delivery device.

2. The delivery device according to claim 1, which further comprises a contact surface, said at least one first compensator being constructed in the form of a diaphragm configured to bear substantially immovably against said contact surface when a positive pressure prevails in the delivery device and to move into said overall volume when a negative pressure prevails in the delivery device.

3. The delivery device according to claim 1, wherein said at least one first compensator permits a reduction in size of said overall volume by up to 5%.

4. The delivery device according to claim 1, wherein said at least one first compensator permits a reduction in size of said overall volume by up to 5% at a negative pressure of lower than 500 mbar.

5. The delivery device according to claim 1, which further comprises at least one second compensator, said at least one second compensator configured for increasing a size of said overall volume when a threshold positive pressure is reached in the delivery device and permitting substantially no increase in size of said overall volume when a pressure below said threshold positive pressure prevails.

6. The delivery device according to claim 5, wherein said threshold positive pressure is at least 5 bar.

7. The delivery device according to claim 5, wherein said at least one second compensator can increase said size of said overall volume by up to 15%.

8. The delivery device according to claim 5, wherein said at least one second compensator increases said size of said overall volume substantially abruptly when said threshold positive pressure is reached.

9. The delivery device according to claim 5, wherein said at least one second compensator is constructed in the form of a surface part under a preload, said surface part being movable counter to said preload when a positive pressure above said threshold positive pressure prevails, causing said overall volume to increase in size.

10. The delivery device according to claim 5, wherein said at least one first compensation element and said at least one second compensator are formed jointly as a combined compensator.

11. The delivery device according to claim 1, wherein said at least one first compensator is disposed between said delivery unit and said metering unit.

12. A motor vehicle, comprising:
an internal combustion engine;
an exhaust system associated with said internal combustion engine and configured for carrying out a selective catalytic reduction; and
a delivery device according to claim 1 having a reducing agent tank and configured for delivering reducing agent from said reducing agent tank into said exhaust system.

13. The delivery device according to claim 1, wherein the delivery device exhibits a substantially incompressible behavior in an operating range.

14. The delivery device according to claim 1, wherein the reducing of the overall volume by said at least one first compensator prevents additional reducing agent from passing into the delivery device.

15. A delivery device for delivering liquid reducing agent, the delivery device comprising:
a reducing agent tank; and
a delivery unit for delivering liquid reducing agent, at least one first compensator for compensating changes in volume, a reducing agent line and a metering unit for metering liquid reducing agent;
at least said delivery unit, said at least one first compensator, said reducing agent line and said metering unit together having an overall volume to be filled with a reducing agent and being configured for delivering, conducting and metering the reducing agent from said reducing agent tank; said at least one first compensator being configured for reducing said overall volume when a negative pressure occurs in the delivery device as a result of a reduction of volume in the reducing agent during cooling of the reducing agent prior to freezing of the reducing agent;
said at least one first compensator being configured such that no increase in said overall volume prevails in an operating pressure range between 0 bar and 5 bar; and
a contact surface, said at least one first compensator including a diaphragm disposed on said contact surface, said contact surface having a bore formed therein within an area of said diaphragm, said bore for allowing air to contact the diaphragm and deflect the diaphragm when a negative pressure prevails in delivery device.

16. The delivery device according to claim 15, wherein the reducing of the overall volume by said at least one first compensator prevents additional reducing agent from passing into the delivery device.

* * * * *